United States Patent Office 3,335,178
Patented Aug. 8, 1967

3,335,178
PROCESS OF CONTROLLED DICHROMATE OXIDATION OF ALKYL NAPHTHALENES
Peter R. Taussig, Metuchen, N.J., and Nylen L. Allphin, Jr., Pinole, Calif., assignors to Marathon Oil Company, Findlay, Ohio, a corporation of Ohio
No Drawing. Filed Apr. 22, 1966, Ser. No. 548,026
10 Claims. (Cl. 260—524)

This application is a continuation-in-part of application S.N. 224,252 filed Sept. 17, 1962, now abandoned.

This invention relates to chemical reactions and more particularly to liquid phase chromate oxidation of dimethylnaphthalenes to preferentially produce β-substituted naphthalene dicarboxylic acids or naphthalene having β-carboxylic acid groups.

The nomenclature used herein is that conventionally used in naphthalene chemistry. The positions on the naphthalene nucleus are numbered as shown on page C-510 of the 45th edition of the Handbook of Chemistry and Physics, Chemical Rubber Company (Cleveland, 1964). Those carbon atoms which are adjacent to the 2 carbon atoms common to both rings are designated alpha. Thus the alpha positions are positions 1, 4, 5 and 8 and positions 2, 3, 6 and 7 are termed "beta." In any given dimethylnaphthalene, the substitution may occur entirely at the alpha positions, entirely at the beta positions, or with one alkyl group at an alpha position and the other at a beta position.

Separation of a mixture of such methylnaphthalenes is difficult since the boiling points of individual members of the mixture are quite close, thus separation by distillation is uneconomical on a commercial scale. The production of polymers derived from a dicarboxylic acid requires a substantially pure acid which has not heretofore been economically directly obtainable from mixed dimethylnaphthalenes.

In general, the process of the instant invention provides for controlled oxidation of lower molecular weight polyalkyl substituted aromatic hydrocarbons and in particular methyl substituted naphthalenes with an aqueous solution of a chromate catalyst containing a high valence chromium ion, such as sodium dichromate catalyst. In one specific embodiment, 1,6-dimethylnaphthalene under high agitation is subjected to a carefully controlled condition of temperature to form a mixture of naphthalene and β-naphthoic acid. Under the carefully controlled heating and the high agitation any α-carboxylic acid which is formed decarboxylates and naphthalene results.

According to the instant invention, isomers of methyl substituted naphthalene are oxidized to predominately β-substituted naphthalenes for easy separation thereof. The invention further has particular utility in treating mixed dimethylnaphthalenes such as 1,6- and 2,6-dimethylnaphthalene to provide relatively pure β-carboxylic acid products or derivatives thereof. We have discovered that a carefully controlled temperature provides means for controlling distribution of the produced isomers. Thus it is possible to produce a mixture from which the products are separable.

Accordingly, among the objects and advantages of the present invention is to provide a process for a controlled chromate oxidation of lower molecular weight polyalkyl substituted naphthalenes to preferentially produce β-carboxy naphthalene and its derivatives.

Another object of the invention is to preferentially produce a β-naphthoic acid from 1,6-dimethylnaphthalene.

It is still another object of the invention to provide a process for chromate oxidation of mixed dimethylnaphthalenes to preferentially produce a readily separated mixture.

These and other objects and advantages of the invention may be readily ascertained by referring to the following description which is intended to illustrate the invention and not to limit the spirit or scope thereof.

For some of the experiments a microreactor was used in which methylated naphthalenes were oxidized by sodium dichromate. Agitation of the microreactor tubes was by a fast oscillating motion. From 0.5 to 1.0 gram of a selected methylated naphthalene was added to a micro-reactor tube with enough saturated aqueous sodium dichromate solution to give from one equivalent to a 50% excess of the dichromate necessary for the required oxidation. Where the total volume of the aqueous dichromate was less than 10 ml. quantity, an additional volume was added to increase the volume to the preferred approximately 10 ml. quantity.

The reactor was subsequently sealed and vigorous shaking undertaken, while the reactor was heated to the desired temperature. The temperature was maintained at the desired level for the desired period of time and then rapidly cooled back to room temperature. The resulting solid, insoluble, chromic oxide was filtered from the liquid phase, and the resulting solid chromic oxide and filtrate were extracted with ethylether to remove neutral organic materials in the etheral phase. These ether extracts were combined, dried, and concentrated to recover the neutral organic materials.

The aqueous filtrate, which was basic, was acidified with hydrochloric acid and the aromatic carboxylic acids formed during the reaction were precipitated. The acid was recovered by filtration, washed well with water and dried. A neutral equivalent of the carboxylic acid was determined for an evaluation of purity and the neutral materials were analyzed by gas-liquid chromatography to determine their composition.

Following the foregoing experimental procedure, small quantities of 1,6-dimethylnaphthalene in three separate containers were placed in the microreactor and heated to 275, 300 and 325° C., respectively. In three other tests, samples of 2,6-dimethylnaphthalene were separately placed in the microreactor vessel and heated to 250, 275, 300 and 325° C., respectively.

Analysis of the products after the α-methylnaphthalene was heated in the reactor indicated considerably increased percentages of naphthalene in the neutral products isolated when the reaction temperature had been at a temperature of about 275° C. and above. This was not true when β-methylnaphthalene was heated at the same temperature for the same reaction time. The 250° and 275° C. tests of 1,6-dimethylnaphthalene produced the largest quantity of dicarboxylic acids with minor amounts of naphthalene and monocarboxylic acids. This indicates that where α and β-methylnaphthalenes are being separated, the reaction temperature must be maintained below about 275° C. Increased recovery of monocarboxylic acid and naphthalene was obtained from the oxidation of 1,6-dimethylnaphthalene at temperatures above about 275° C. From the 2,6-dimethylnaphthalene, only the expected dicarboxylic acid was formed. It therefore appears that oxidation occurs at temperatures of about 250° to 400° and preferably at temperatures of about 275° to 325° C. Decarboxylation of the β-carboxy groups occurs at about 275° to 400° C. and preferably at temperatures of 300° to 325° C.

The oxidation of the 1,6-dimethylnaphthalene at 300° C. resulted in the formation of a very small quantity of naphthalene and 2-methylnaphthalene and substantial quantities of the organic acids. Upon esterification of these acids with ethyl alcohol, two esters were formed with divergent boiling points. A neutral equivalent of the formed acid was found to be approximately 130 showing that approximately 30% of the acids actually formed were monocarboxylic acids.

In order to determine how much more rapidly the α-isomer was decarboxylated than the β-isomer, the sodium salt of the α-naphthoic acid and β-naphthoic acid were reacted as follows:

decarboxylation of some of the dicarboxynaphthalenes of the mixture leaves 2,6-, 2,7-, and the 2,3-naphthalene dicarboxylic acids in the mixture along with β-naphthoic acid.

The following Table 1 indicates the rates of reaction in a nitrogen atmosphere rather than air.

TABLE 1

| Feed | | Temp. (° C.) | Time (min.) | Feed Unchanged (millimoles) | Naphthalene Formed (millimoles) | Cr₂O₃·H₂O (millimoles) | Acids Formed (millimoles) |
|---|---|---|---|---|---|---|---|
| Compound | Millimoles | | | | | | |
| 2-methylnaphthalene | 7.0 | 275 | 60 | 0.05 | 0.95 | --- | 5.6 | 6.95 |
| 2-methylnaphthalene | 7.0 | 275 | 30 | 0.95 | --- | 3.3 | 4.1 |
| 1-methylnaphthalene | 6.5 | 275 | 30 | 1.20 | 2.5 | 3.7 | 2.2 |
| 1-methylnaphthalene | 6.5 | 275 | 120 | 0.46 | 5.6 | 5.9 | 0.30 |
| 1-methylnaphthalene | 6.5 | 275 | 120 | 0.48 | 5.65 | 5.9 | 0.33 |

2.0 g. of the sodium salt of the α and β acids were each placed in 5 grams of water and heated for one hour at 350° C. The sodium salt of α-naphthoic acid produced Additional runs were made in the residual air atmosphere remaining in the reactor and these results are given below in Table 2.

TABLE 2

| Feed | | Temp. (° C.) | Time (min.) | Feed Unchanged (millimoles) | Naphthalene Formed (millimoles) | 2-me Naphthalene Formed (millimoles) | Cr₂O₃·H₂O (millimoles) | Acids Formed (millimoles) | Neutral Equivalent of the Acids | Remarks |
|---|---|---|---|---|---|---|---|---|---|---|
| Compound | Millimoles | | | | | | | | | |
| 1-methylnaphthalene | 7.0 | 300 | 60 | 1.0 | 2.0 | --- | 6.3 | 4.3 | 171.3 | M.P. 160-61. |
| 1-methylnaphthalene | 7.0 | 325 | 60 | 0.04 | 4.2 | --- | 6.7 | 2.5 | --- | M.P. 183-84. |
| 2-methylnaphthalene | 7.0 | 300 | 30 | None | 0.02 | --- | 6.5 | 7.0 | --- | |
| 2-methylnaphthalene | 7.0 | 325 | 10 | 0.04 | 0.04 | --- | 7.0 | 7.0 | --- | |
| 2,6-dimethylnaphthalene | 3.5 | 250 | 60 | 2.05 | None | --- | 2.3 | 1.57 | --- | |
| 2,6-dimethylnaphthalene | 3.5 | 275 | 60 | 0.83 | None | --- | 5.4 | 2.6 | --- | |
| 2,6-dimethylnaphthalene | 3.5 | 300 | 30 | 0.65 | None | --- | 6.0 | 2.5 | --- | |
| 2,6-dimethylnaphthalene | 3.5 | 325 | 15 | 0.65 | None | --- | 6.7 | 2.7 | 108.4 | |
| 1,6-dimethylnaphthalene | 3.5 | 275 | 60 | 0.29 | None | None | --- | 3.25 | 110.2 | All dicarboxylic acid. |
| 1,6-dimethylnaphthalene | 3.5 | 300 | 30 | None | 0.07 | None | --- | 3.45 | 121.8 | 78% diacid, 22% monoacid. |
| 1,6-dimethylnaphthalene | 3.5 | 300 | 15 | 1.47 | 0.03 | 0.05 | 3.7 | 1.43 | 127.6 | 69.4 diacid, 30.6 monoacid. |
| 1,6-dimethylnaphthalene | 3.5 | 325 | 60 | None | 0.10 | None | --- | 3.28 | 144.6 | 42.8 diacid, 57.2 monoacid. |
| 1,2-dimethylnaphthalene | 3.5 | 300 | 15 | 1.45 | 0.03 | 0.04 | 3.68 | 1.45 | 131.0 | 67% diacid, 33% monoacid. | about 80% naphthalene, while the sodium salt of β-naphthoic acid produced about 20% naphthalene during the heating.

Upon heating the sodium salt of β-naphthoic acid to 450° C. for 5 minutes all of the β-naphthoic acid was hydrothermally decomposed to naphthalene.

From the foregoing it is clear that the instant invention provides a process for oxidation and subsequent decarboxylation under vigorous agitation and controlled conditions of temperature to provide for separation of mixed isomers of dimethylnaphthalene derivatives. In effect, the process provides control of an oxidation reaction to produce nearly complete oxidation to the carboxy derivatives of the methyl substituents, but only partial decarboxylation by subsequent careful control of heating to preferentially remove or split off the α-carboxylic acid groups from the naphthalene ring leaving substanitally only β-carboxylic acid groups on the ring.

Additionally a good yield of naphthalene may be obtained by a liquid phase oxidation by forcing the reaction to completion by temperature changes.

Separation of some of the isomers from a mixture of isomeric dimethylnaphthalenes may be accomplished by vigorous agitation to give a high degree of contact between the reactants, in conjunction with temperature control of the oxidation so as to provide oxidation and possibly decarboxylation of a portion of the methyl substituents. By temperature control at a higher temperature, partial The temperature utilized in the range of 275–400° C. is, of course, dependent on the time of contact of reactants at the reaction temperature. Lower temperatures are not normally economically feasible due to the increased reaction time necessary to compensate for the lower rate of reaction. Higher temperatures are generally more difficult to control due to the increased rate of reaction. Thus the temperatures in the middle of the range (275°–325°) are generally the preferable temperatures.

The times for the dicarboxylation reactions of the present invention will vary signficantly according to the temperatures employed and the constituents of the mixtures utilized as starting materials. In general, reaction times of from 0.01 to about 10 hours may be employed with reaction times of from about 0.1 to about 2 hours being especially preferred. Routine trial runs may be utilized to determine the optimum times for the particular conditions employed, with the optimum time being selected so as to be sufficient to reduce the content of α-carboxylic acid groups to the desirable minimum without excessive decomposition of β-carboxylic acid groups.

The chromate material useful for the oxidation is a high valence chromium compound (having a valence of 4–6 and preferably 6) which is soluble in water. In one form, sodium dichromate dihydrate has been found effective since it is commercially available and contains a chromium ion having a high valence (hexavalent) which is the oxidizing state. Other soluble chromates or dichromates such as ammonium, potassium, calcium, copper, iron, rubidium, zinc, etc. are useful in the process. Other high valence chromium compounds, having the chromium as a high valence ion, soluble in water may be used, for example, chromic acid, etc.

The tests show that 2-methylnaphthalene oxidizes faster than 1 - methylnaphthalene with the dimethylnaphthalenes being in between the two. Further, α-naphthoic acids are decarboxylated much more rapidly than the β-naphthoic acids, providing a method of separating the two isomers. Where dicarboxylic acids are the desired product from 1,6 - dimethylnaphthalene oxidation, the reaction temperature must be kept at or below about 275° C. The monocarboxylic acid derivatives are easily prepared by increasing the temperature above that necessary to produce the dicarboxylic acids. Oxidation of a mixture of dimethylnaphthalenes below about 275° C. produces a mixture containing predominately naphthalene dicarboxylic acids and some recovered hydrocarbons. The carboxynaphthalenes may be separated from the mixture by base extraction. Further controlled heat treatment, above about 275° C., decarboxylates the resultant naphthalene dicarboxylate salts to a mixture of β-naphthoic acid, naphthalene and β-substituted naphthalene dicarboxylic acids. Separation of these materials is relatively easy and provides a method for obtaining pure carboxylic acids of naphthalene. Under relatively mild conditions 1 - methylnaphthalene and 1,6 - dimethylnaphthalenes oxidize to naphthalene and β-naphthoic acid whereas 2 - methylnaphthalene and 2,6 - dimethylnaphthalene produce no naphthalene. Thus there is provided a method of separation of these materials.

Oxidation of the aromatics of a catalytic cycle oil, for example, according to the present invention so as to accomplish nearly complete oxidation but only partial decarboxylation produces only β-substituted naphthalene carboxylic acid and naphthalene. Such a resulting mixture contains only the 2,6-, 2,7-, and the 2,3-naphthalene dicarboxylic acids. Only one monocarboxylic acid is present and that is the β form. The mixture of aromatics is thus simplified and provides an easy way to produce substantially pure isomers.

*Example I*

A mixture of β-substituted monomethylnaphthalenes, α-substituted monomethylnaphthalenes, α,β-substituted dimethylnaphthalenes, α,α-substituted dimethylnaphthalenes, β,β - substituted dimethylnaphthalenes and tetramethylnaphthalenes substituted to methyl groups in β positions and two methyl groups in α positions, (0.75 gram of the mixture) is added to a microreactor tube containing saturated aqueous sodium dichromate solution (approximately 25% excess of the stoichiometric quantity of dichromate necessary for the oxidation). The reactor is then sealed and vigorously shaken while simultaneously being heated at about 300° C. for reaction time of approximately one hour. The reactor is then cooled and the contents analyzed by conventional gas liquid chromatographic techniques. Analysis indicates that the products of the reaction consist primarily of β-substituted naphthalene mono and dicarboxylic acid, together with some naphthalene and a small amount of unreacted starting material.

*Example II*

With the mixture of dimethyl naphthalene having an analysis of approximately as follows:

| Constituent: | Weight percent |
|---|---|
| 2,6-dimethyl naphthalene | 25 |
| 2,7-dimethyl naphthalene | 19 |
| 1,7-dimethyl naphthalene | 20 |
| 1,6-dimethyl naphthalene | 15 |
| 1,3-dimethyl naphthalene | 17 |
| 1,4-dimethyl naphthalene | 0.5 |
| 2,3-dimethyl naphthalene | 1.6 |
| 1,5-dimethyl naphthalene | 0.8 |
| 1,2-dimethyl naphthalene | 0.5 |
| | 99.4 |

This is heated at approximately 295° C. for approximately two hours with vigorous agitation, the products produced consist essentially of β-substituted naphthalene dicarboxylic acids with some naphthalene and a minor portion of unreacted starting materials. All analyses are by conventional gas liquid chromatographic techniques.

In summary, the invention of the present invention comprises a process for producing a mixture containing essentially only β-substituted naphthalene carboxylic acid (which term includes both mono and poly substituted carboxylic acids) and naphthalene. The process comprises in combination, the heating of a mixture of methyl substituted naphthalenes (which terms includes both mono and poly substituted methyl naphthalenes) containing β-substituted methyl naphthalenes with an excess of the stoichiometric amount of an oxidizer which consists of an aqueous solution of a compound containing oxygen in a high valence chromium ion having a valence of 4 to 6, inclusive. Said heating being for a combination of time and temperature which is sufficient to decarboxylate substantially all of any α-substituted naphthalene carboxylic acids which are formed without decarboxylating a major portion of the β-substituted naphthalene carboxylic acids which are formed.

While the invention has been described with reference to specific examples there is no intent to limit the spirit or scope of the invention to the precise details set forth, except as defined in the following claims.

What is claimed is:

1. A process for producing a mixture containing essentially only β-substituted naphthalene carboxylic acids and napthalene which process comprises in combination the heating from about 0.1 to about 10 hours at from about 275 to about 400° C. of a mixture of methyl substituted naphthalenes containing β-substituted methyl naphthalenes with an excess of a stoichiometric amount of an oxidizer which consists of aqueous solution of a compound containing oxygen and a high valence chromium ion having a valence of 4 to 6 inclusive, said heating being for a combination of time and temperature which is sufficient to decarboxylate substantially all of any α-substituted naphthalene carboxylic acids which are formed but is not sufficient to decarboxylate a major portion of the β-substituted naphthalene carboxylic acids which are formed.

2. The process of claim 1 wherein the high valence chromium ion is a hexavalent chromium ion.

3. The process of claim 1 wherein the oxidizer consists of an aqueous solution of a soluble dichromate.

4. The process of claim 3 wherein the soluble dichromate is sodium dichromate.

5. A process for the preparation of mixtures containing naphthalene, and β-substituted naphthalene carboxylic acids which process comprises heating a mixture of methyl substituted naphthalenes which includes naphthalenes having a β-substituted methyl group and naphthalenes having an α-substituted methyl group with an aqueous solution of an oxidizer which consists of a water soluble compound containing oxygen and a high valence chromium ion, having a valence of 4 to 6 inclusive, said oxidizer being present in an amount greater than the stoichiometric amount necessary for the oxidation of the methyl groups, said heating being in the range of from 275 to 400° C. for a period of from 6 to 120 minutes under vigorous agitation.

6. The process of claim 5 in which the oxidizer consists of a solution of a compound containing oxygen and a hexavalent chromium ion.

7. The process of claim 6 wherein the compound containing the chromium ion is sodium dichromate.

8. The process of claim 1 wherein the β-substituted methyl naphthalenes include β-substituted monomethyl naphthalenes, β,β-substituted dimethyl naphthalenes, and α,β-substituted dimethyl naphthalenes.

9. The process of claim 1 wherein the methyl naphthalenes comprise a major portion of dimethyl naphthalenes.

10. The process of claim 5 wherein the temperature is from about 275 to about 325° C. and the time is from about 0.1 to about 2 hours.

References Cited

UNITED STATES PATENTS

| 1,998,925 | 2/1935 | Demant | 260—524 |
| 2,020,505 | 11/1935 | Jaeger | 260—522 |
| 2,020,506 | 11/1935 | Jewett | 260—522 |

LORRAINE A. WEINBERGER, *Primary Examiner.*

S. W. WILLIAMS, *Assistant Examiner.*